Figure 14:
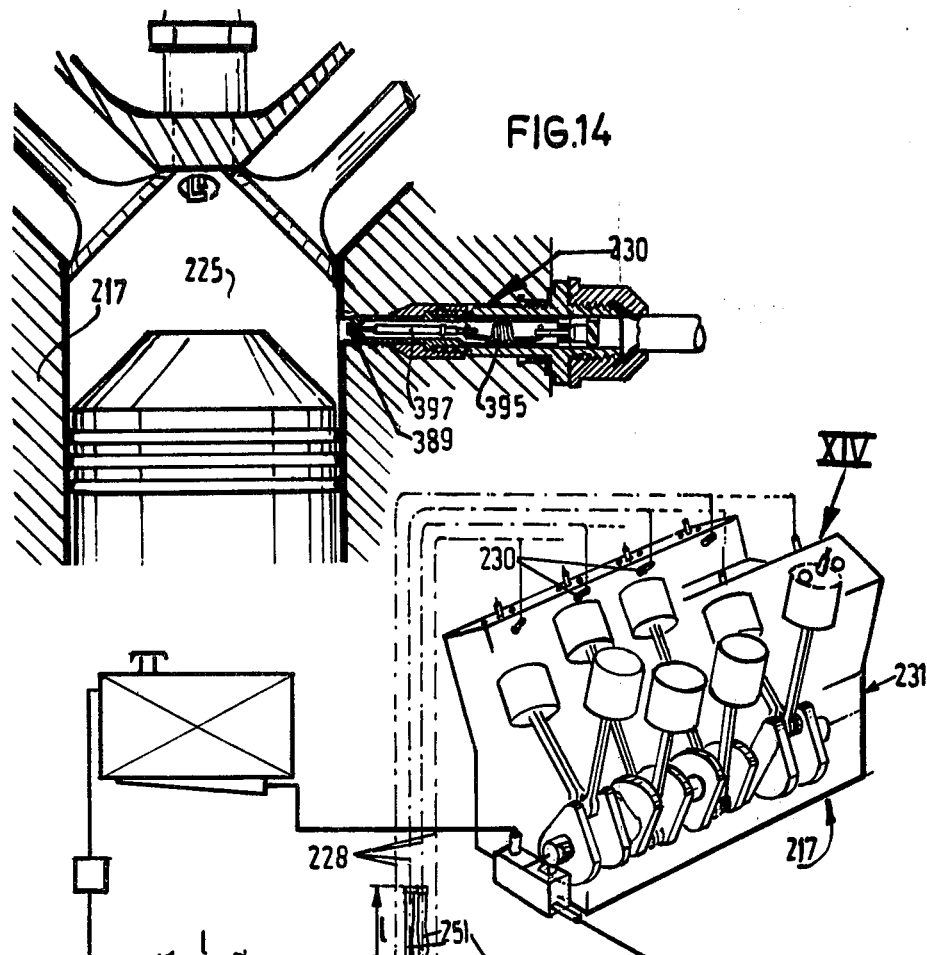

United States Patent [19]

Brinkman

[11] 4,164,920

[45] Aug. 21, 1979

[54] DEVICE FOR SUPPLYING FUEL TO A COMBUSTION ENGINE AND METHOD OF MANUFACTURING SAID DEVICE

[75] Inventor: Willem Brinkman, Velp, Netherlands

[73] Assignee: Holec N.V., Hengelo, Netherlands

[21] Appl. No.: 760,718

[22] Filed: Jan. 19, 1977

[30] Foreign Application Priority Data

Jun. 28, 1976 [NL] Netherlands ................. 7607080

[51] Int. Cl.² ............... F02M 39/02; F02D 1/06; F04B 35/04
[52] U.S. Cl. ............... 123/139 R; 123/139 E; 123/140 MP; 417/410
[58] Field of Search ....... 123/139 R, 139 E, 139 AD, 123/140 MP, 32 AE; 417/410, 413, 415, 418, 460, 469; 92/130 R, 13

[56] References Cited

U.S. PATENT DOCUMENTS

| 3,429,225 | 2/1969 | Keyworth | 92/13 |
|---|---|---|---|
| 3,784,334 | 1/1974 | Hilgert | 417/418 |
| 3,943,892 | 3/1976 | Brinkman | 123/139 E |
| 3,994,272 | 11/1976 | Brinkman | 123/139 E |
| 4,022,174 | 5/1977 | Brinkman | 123/139 E |
| 4,044,745 | 8/1977 | Brinkman et al. | 417/415 |

Primary Examiner—Charles J. Myhre
Assistant Examiner—P. S. Lall
Attorney, Agent, or Firm—John P. Snyder

[57] ABSTRACT

Device for supplying fuel to the atomizer of a combustion engine comprises at least a pump to be connected with the atomizer having a piston-bounded pump chamber and an electromagnet for reciprocating said piston. Said device is improved, particularly with regard to the seal of the pump piston, the control and the adjustment of the pumped quantity of fuel, the life-time and the cooling of the device, the compactness and simplicity of construction and/or simplification of maintenance.

18 Claims, 27 Drawing Figures

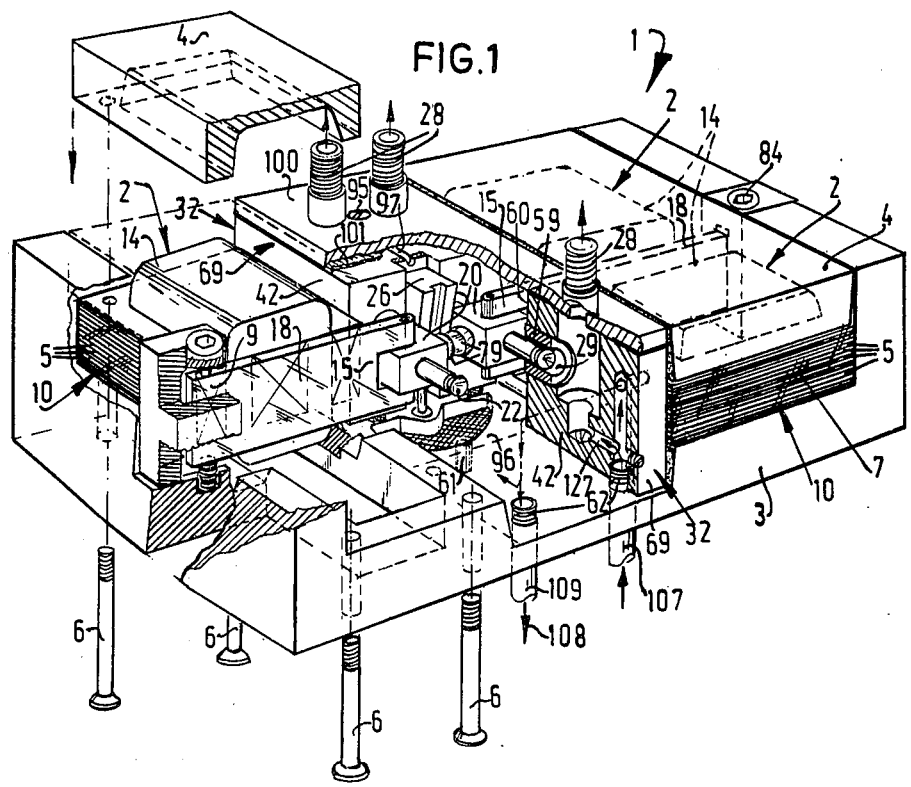
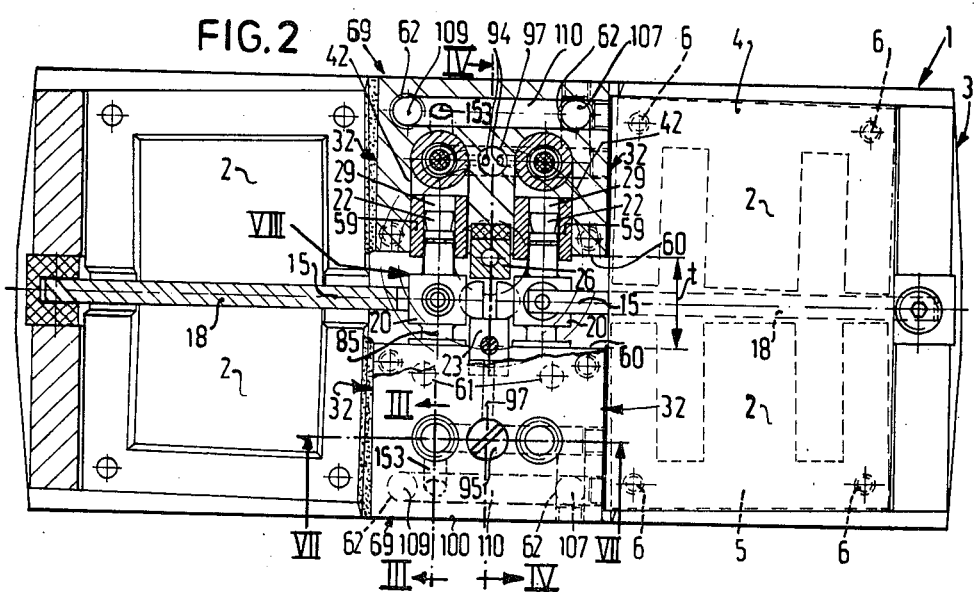

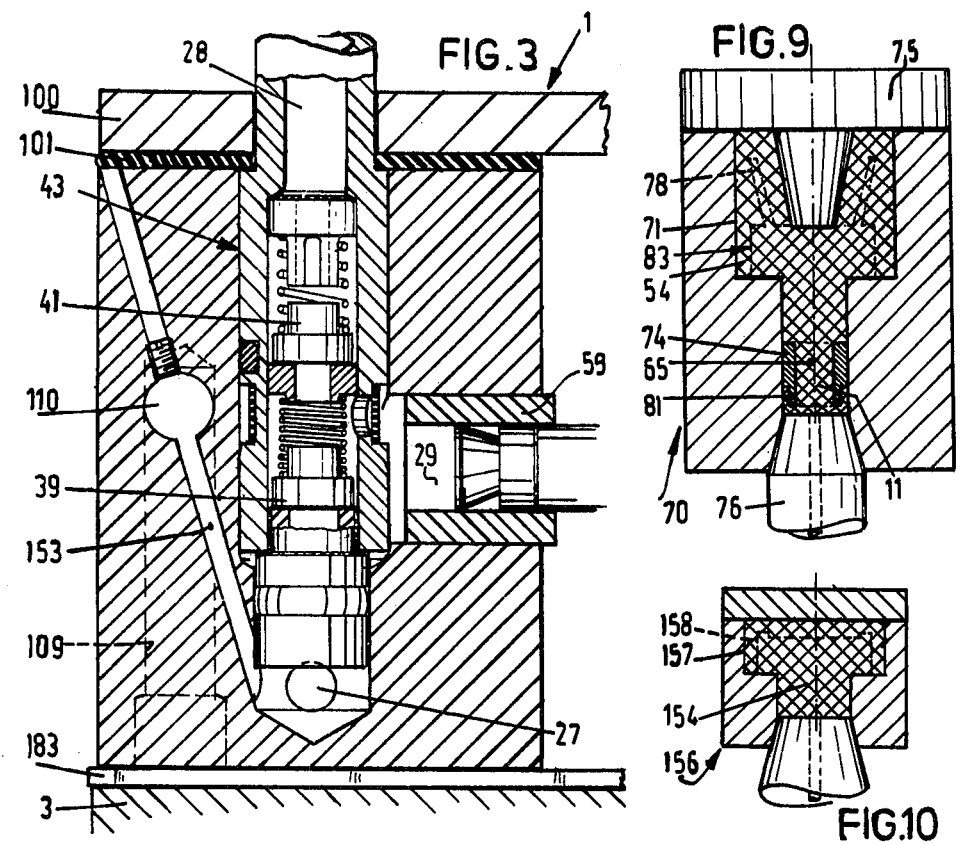
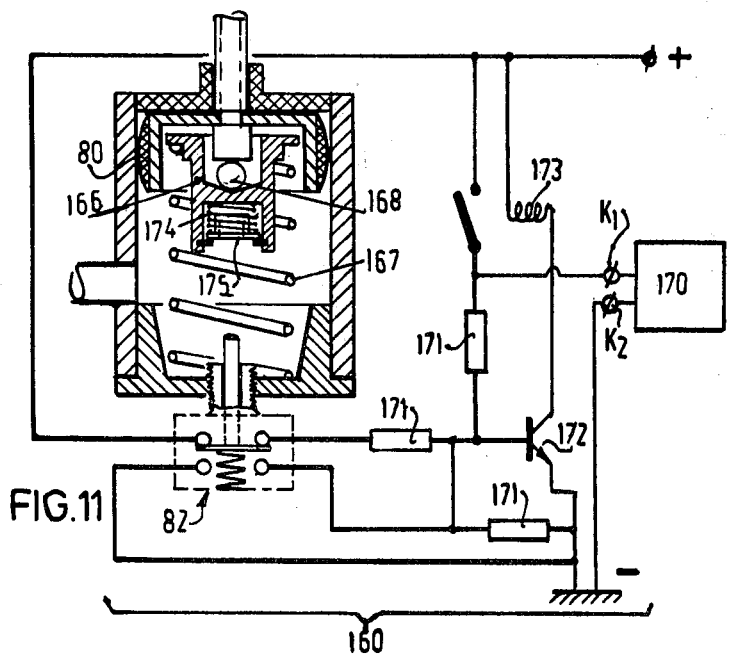

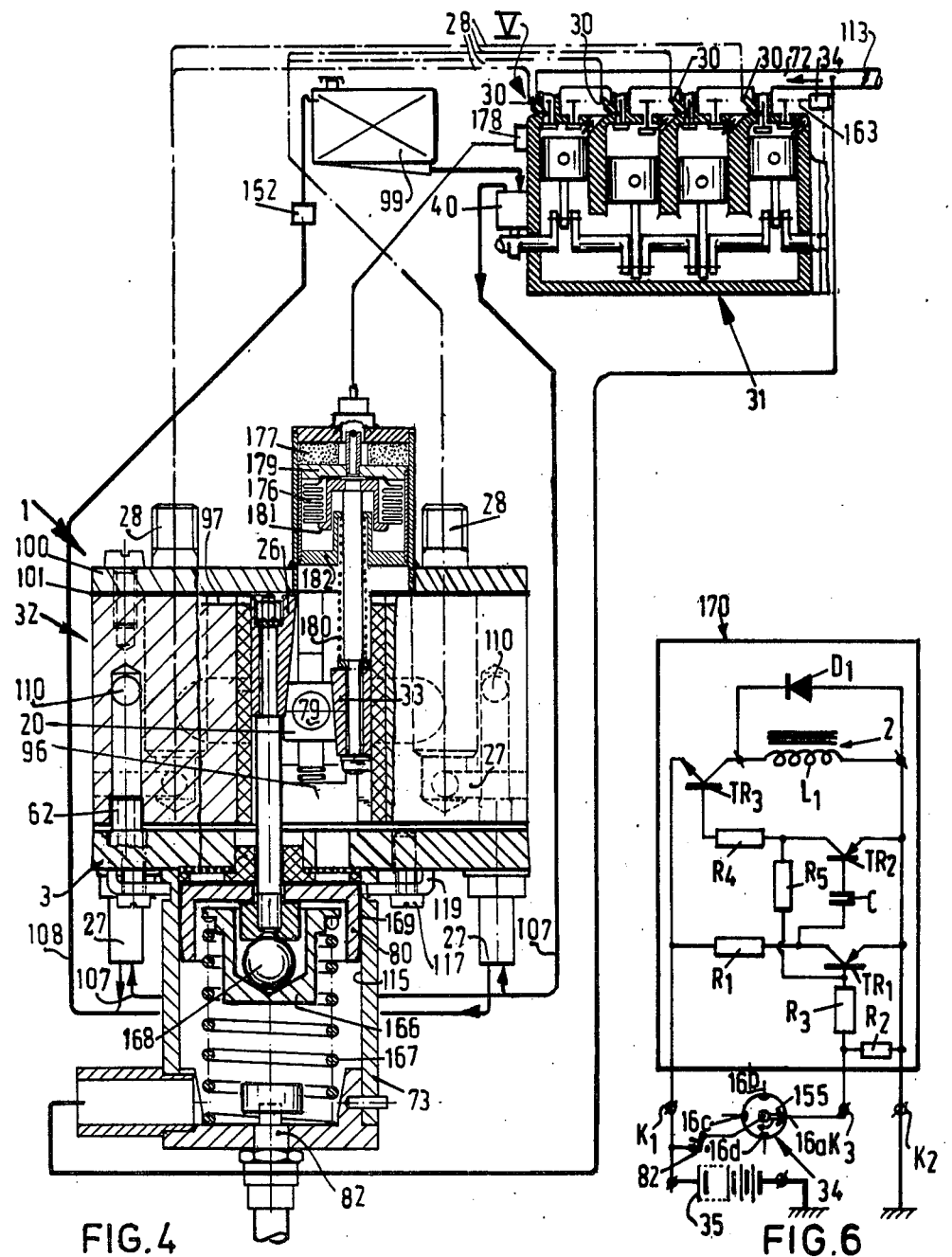

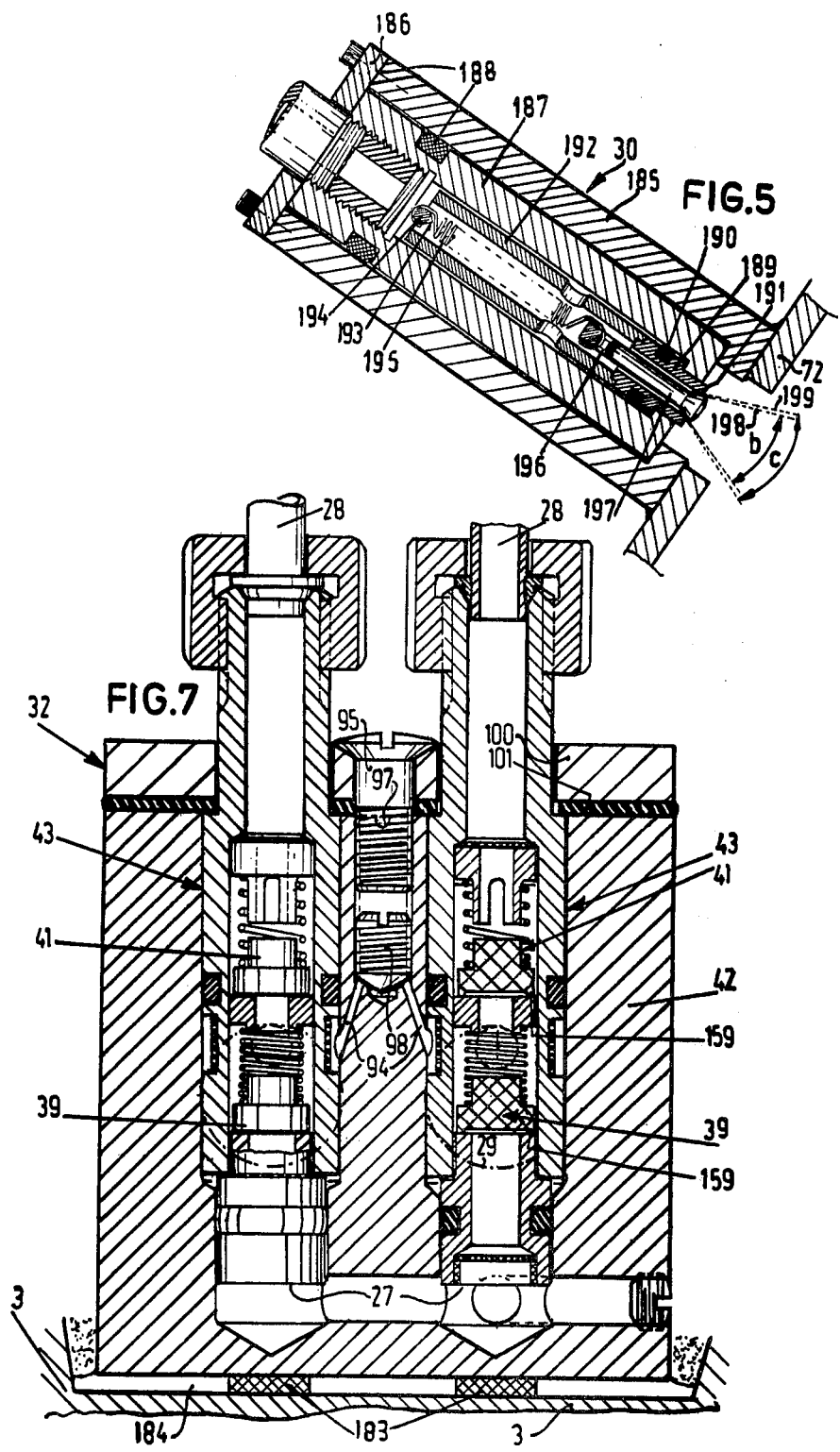

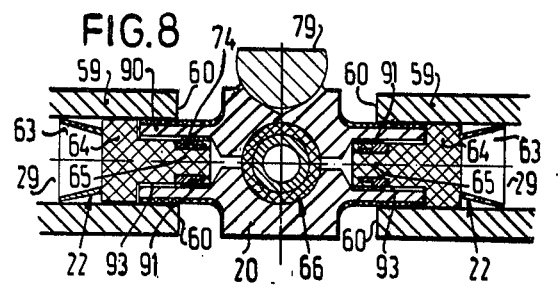
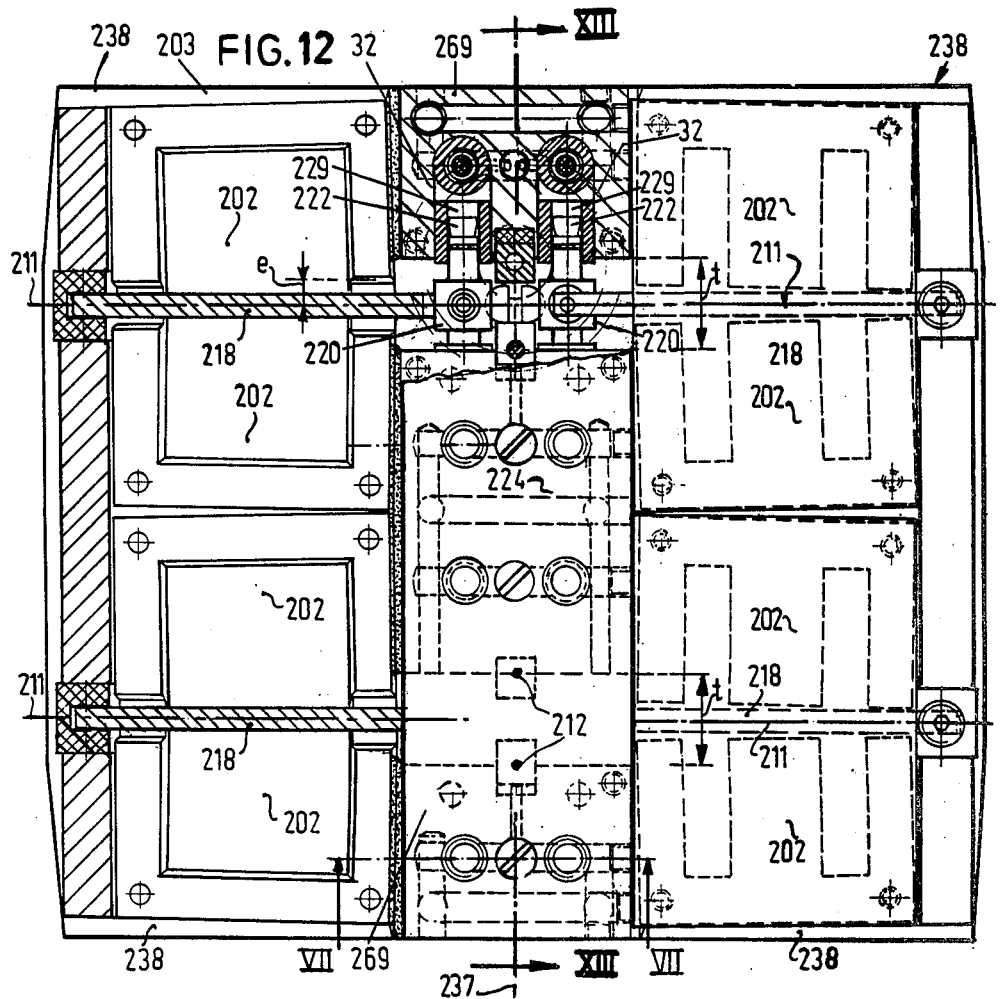

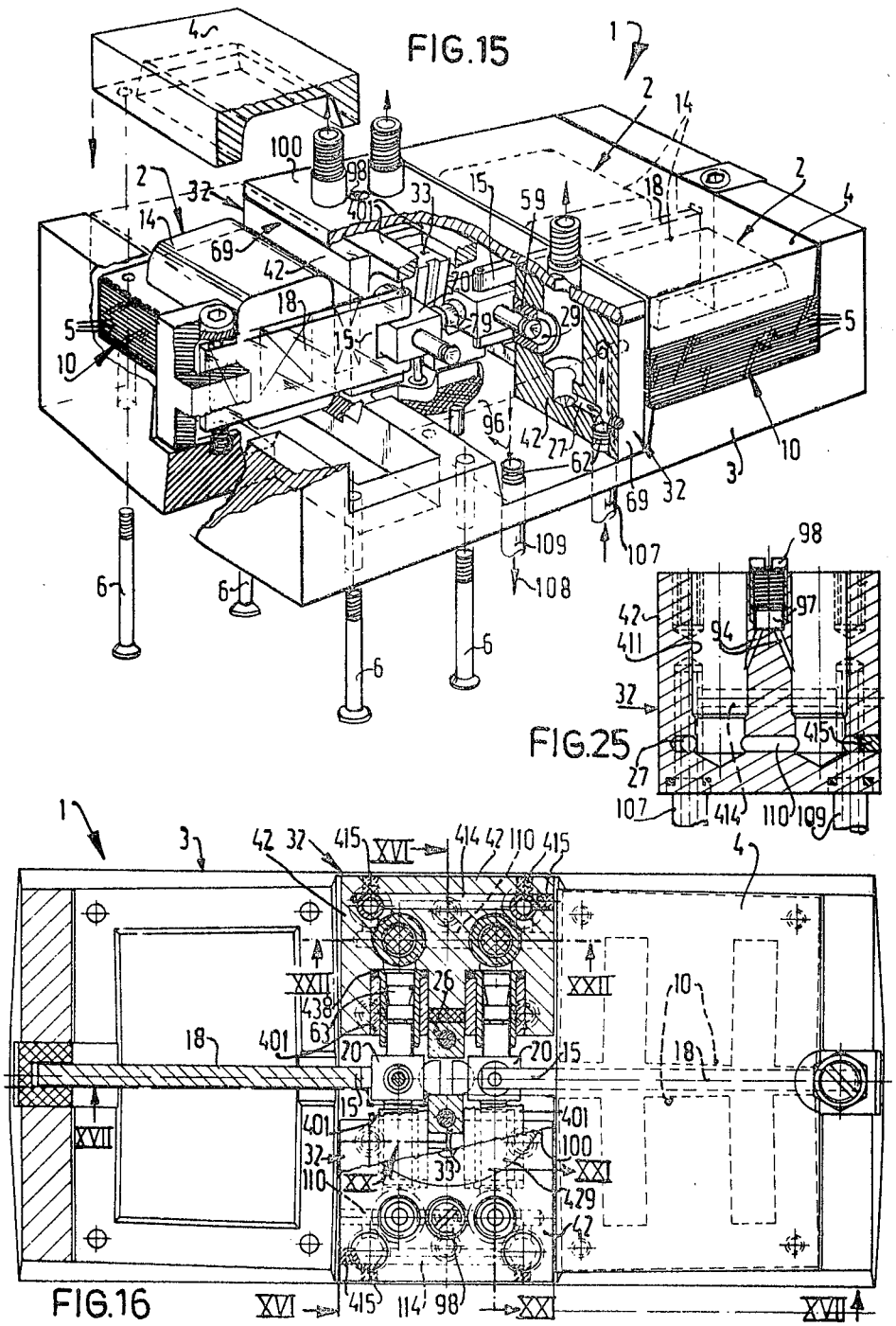

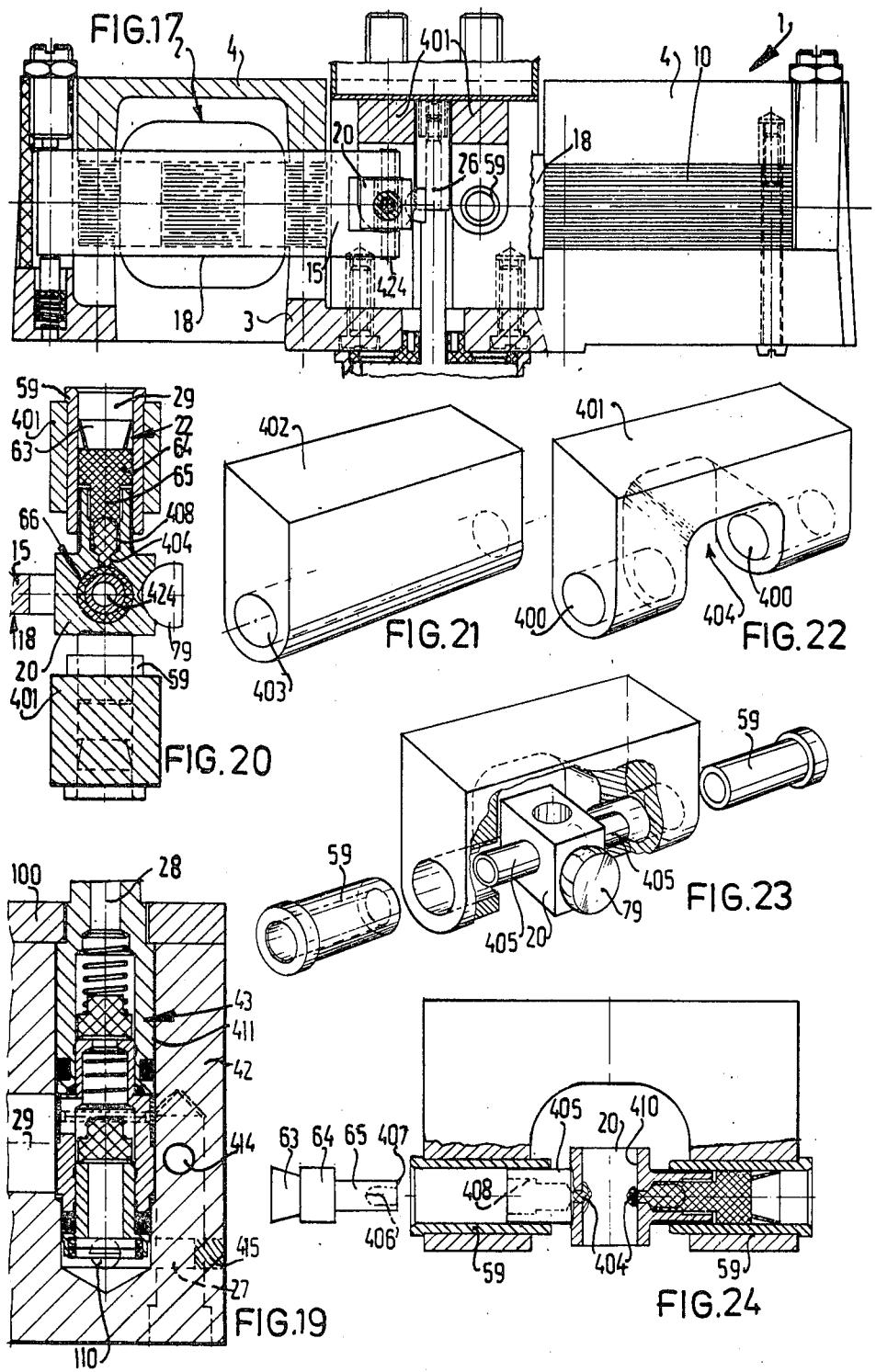

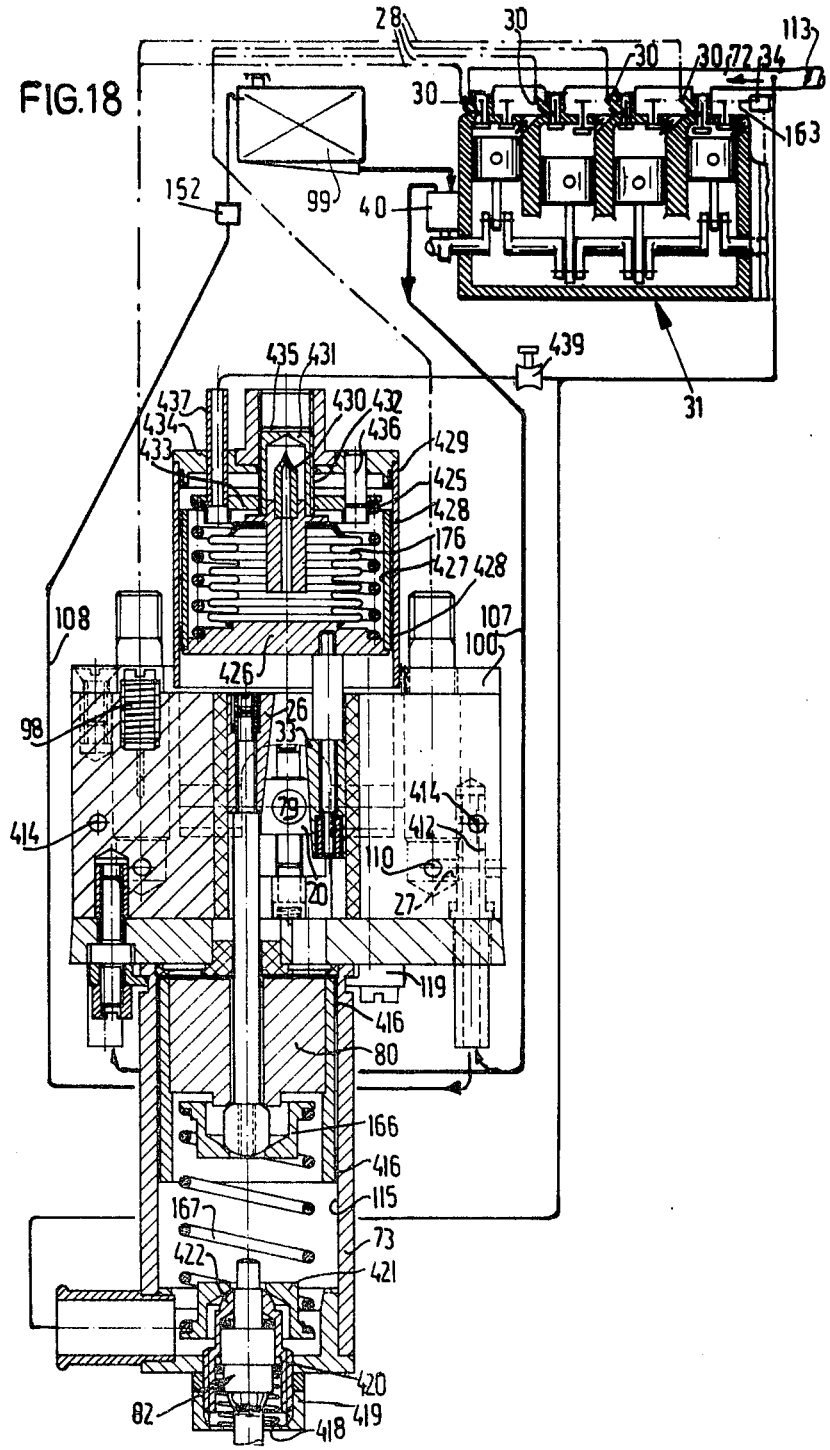

DEVICE FOR SUPPLYING FUEL TO A COMBUSTION ENGINE AND METHOD OF MANUFACTURING SAID DEVICE The invention relates to a device for delivering fuel to at least one atomizer of a combustion engine, said device comprising at least one pump to be connected with the atomizer and having a pump chamber bounded by a piston and driving means for the reciprocatory movement of the piston. Such a device is described in Dutch Patent application No. 73.15769 or U.S. patent application Ser. No. 560,771, now U.S. Pat. No. 4,022,174 the contents of which are considered to be included by reference.

The invention has for its object to further improve the device already proposed, particularly with respect to the seal of the pump piston and the valves, to the control and adjustment of the quantity of fuel displaced by the pump, to the lifetime and cooling of the device, to the compactness and simplicity of the construction and/or to the simplification of maintenance.

The many steps taken in accordance with the invention, preferably in conjuction, are disclosed in the claims and will be set out hereinafter with reference to a drawing.

The invention furthermore relates to a method of manufacturing said device and particularly the piston of said device characterized in that a spray-casting of a synthetic resin is made in a mould whose cavity is overdimensioned and in that the spray-casting is machined to the prescribed measures, particularly at the area of a sealing edge. The piston thus manufactured in accordance with the invention has a sealing edge of excellent material structure, since the material of the sealing edge has not strongly cooled during moulding in the mould cavity. By an analogous method according to the invention a valve is made for said fuel pump.

Figure 13:
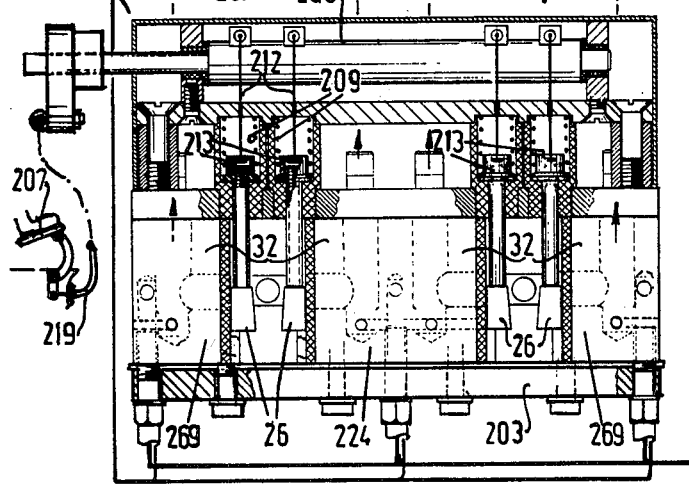

In the drawing:

FIG. 1 is a perspective elevation, partly broken away, of a preferred embodiment of a device in accordance with the invention, FIG. 2 is a plan view, partly broken away, of the device shown in FIG. 1, FIG. 3 is an enlarged sectional view taken on the line III—III in FIG. 2, FIG. 4 is a sectional view taken on the line IV—IV in FIG. 2, the device being schematically connected with a combustion engine, FIG. 5 is an enlarged sectional view of a detail V in FIG. 4, FIG. 6 shows an electric circuit diagram for the device shown in FIG. 1, FIG. 7 is an enlarged sectional view taken on the line VII—VII in FIG. 2, FIG. 8 is an enlarged longitudinal sectional view of detail VIII of FIG. 2, FIG. 9 is a longitudinal sectional view of a casting mould for the manufacture of a piston, FIG. 10 is a longitudinal sectional view of a casting mould for the manufacture of a valve, FIG. 11 shows a variant of detail XI of FIG. 4 with a circuit diagram, FIG. 12 is a plan view of a further device in accordance with the invention for delivering fuel to eight atomizers of a combustion engine, FIG. 13 is a sectional view taken on the line XIII—XIII in FIG. 12, the device being schematically connected with a combustion engine.

FIG. 14 is an enlarged sectional view of detail XIV in FIG. 13.

Figure 26:
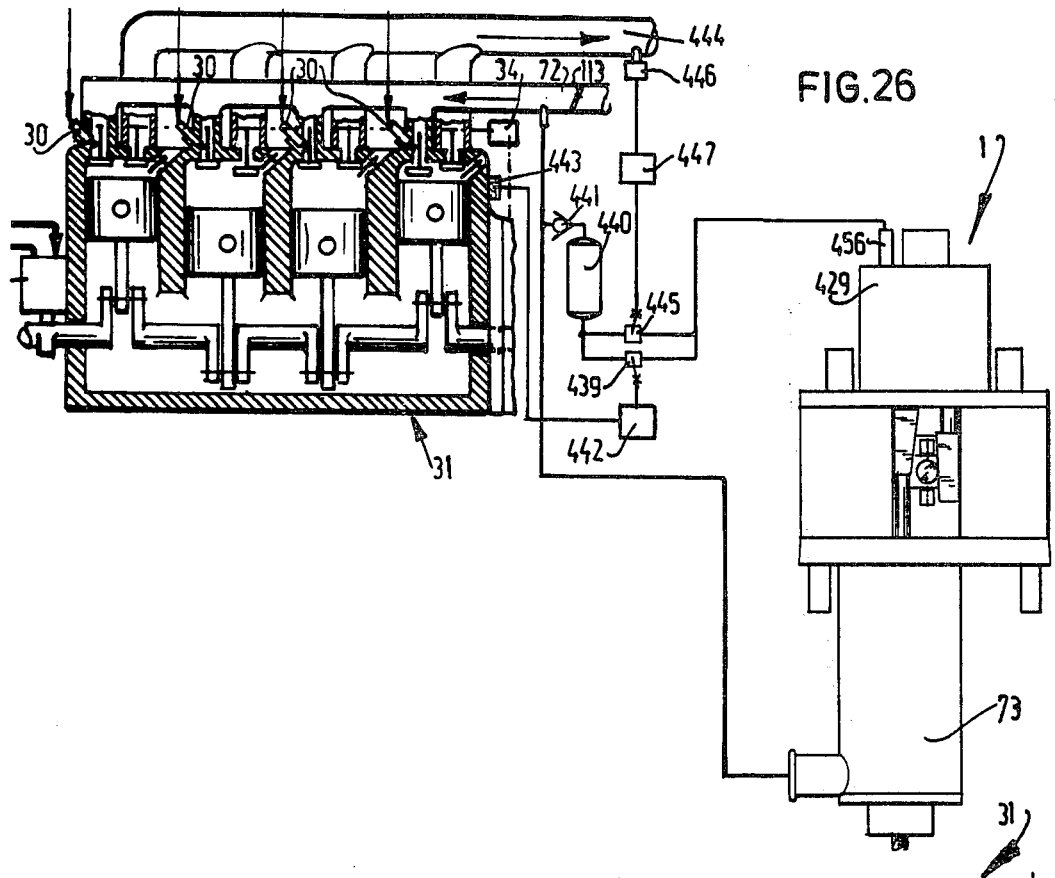
Figure 27:
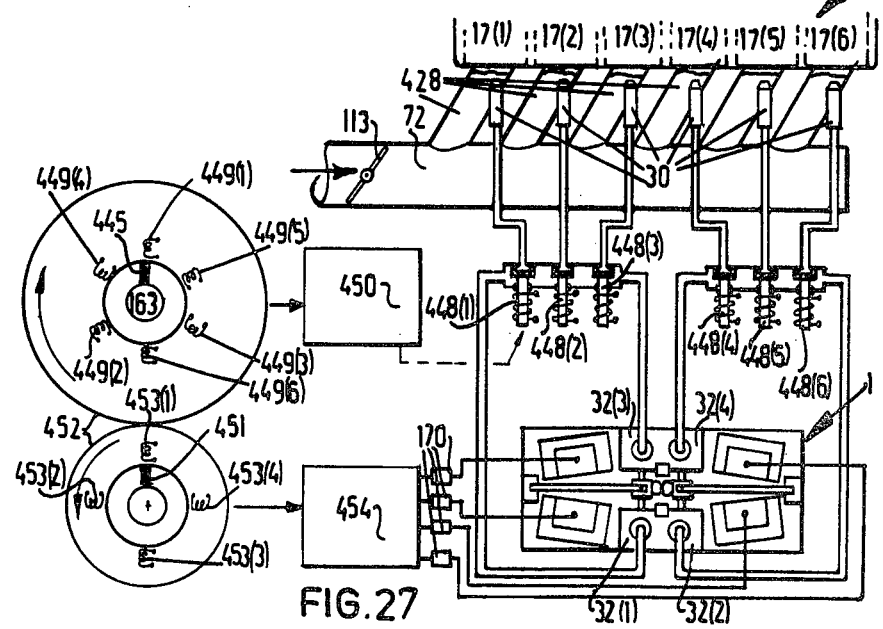

FIG. 15 is a perspective view, partly broken away, of a further developed embodiment of a device in accordance with the invention, FIG. 16 is a plan view, partly broken away, of the device shown in FIG. 15, FIG. 17 is a sectional view taken on the line XVII—XVII in FIG. 16, FIG. 18 is a sectional view taken on the line XVIII—XVIII in FIG. 16, the device being schematically connected with a combustion engine, FIG. 19 is an enlarged sectional view taken on the line XIX—XIX in FIG. 16, FIG. 20 is an enlarged, longitudinal sectional view of detail XX in FIG. 16, FIGS. 21, 22 and 23 are perspective views of the detail XX in progressive manufacturing stages, FIG. 24 is a longitudinal sectional view of detail XX in a manufacturing stage subsequent to that of FIG. 23, FIG. 25 is a sectional view taken on the line XXV—XXV in FIG. 16, FIG. 26 shows a variant of the diagram for connecting the device of FIGS. 15 to 25 with a combustion engine, and FIG. 27 is a plan view of a further developed device embodying the invention for delivering fuel to six atomizers of a 6-cylinder combustion engine.

The device 1 shown in FIGS. 1 to 8 comprises a frame plate 3 of cast or spray-cast aluminium. Two pairs of electromagnets 2 are firmly connected by means of bolts 6 between the frame plate 3 and a lid 4. Each of the electro-magnets 2 comprises a core 10 of a stack of magnetic plates 5 and an energizing coil 14 surrounding said core 10. A plate-shaped armature 18 is adapted to pivot between each pair of alternately energized magnets 2.

At the free end 15 each armature 18 holds a coupling member 20, with which are connected two displacer bodies 22 of two fuel pumps 32. The stroke of the displacer bodies 22 is determined by adjustable actuating means disposed on either side of the coupling members 20 and formed by two wedges 26 and 33. Each pump 32 comprises a pump chamber 29 included in a pump housing 42 and having a fuel inlet 27 and a fuel delivery conduit 28, each conduit leading to an atomizer 30 of the combustion engine 31. Each atomizer 30 has a sleeve 185 welded to the air inlet manifold 72, in which sleeve an atomizer tube 187 is included by means of a sealing ring 188 and a lid 186. The atomizer tube 187 includes a valve housing comprising an outlet portion 189 externally sealed by a sealing ring 190 and an inlet tube 192. The outlet portion 189 with its seat 191 is made from tool steel so that as compared with the conventional hard-steel seats it can be manufactured at very low cost. The outlet portion 189 is joined by an inlet tube 192 having at its inlet end a transverse groove 193 receiving a transverse pin 194. A tensile spring 195 engages this pin 194 by one end and a transverse bore 196 of a needle valve 197 at the other end, the conical valve surface 198 having a vertex b of 40°, which is smaller than the vertex c of 45° of the conical surface 199 of the seat 191.

The inlet valve 39 and the outlet valve 41 are arranged in a valve housing 43 to be accommodated in the pump housing 42. All valve housings 43 are in common enclosed in the pump housing 42 by means of a lid 100 with the interposition of a layer of elastic material 101. Into each pump housing 42 is pressed with close fit a hard-steel cylinder 59. The pump housings 42 are located pairwise coaxially opposite one another and the front faces 60 of the cylinders 59 are spaced apart by a distance t by means of set pins 61, removed after mounting, and by tapped sleeves 62 rigidly securing the pump housings 42 to the frame plate 3 with or without the interposition of heat-insulating narrow strips 183, which form an air layer 184 between the frame plate 3 and the pump housings 42 in order to reduce the heat transer from the electro-magnets 2 via the frame plate 3 to the pump housings 42. The tapped sleeves 62 constitute at the same time the connecting nipples for the fuel feed lines 107 connected with a fuel feeding pump 40 and for the fuel return conduits leading via a pressure controlvalve 152 to the tank 99, said conduits being connected with a return outlet 109. This return outlet 109 communicates through a high-level channel 110 and downwardly inclined channels 153 with the fuel inlet 27 of the two valve housings 43. Thus the fuel circulates at a high rate through the device 1 so that the fuel is not excessively heated in the device 1. It is, therefore, even possible to mount the device 1 at a fairly hot place, for example, directly on the engine 31. Any fuel vapour bubbles developing when the engine 31 and hence the fuel feeding pump 40 are standing still, will rise from beneath each valve housing 43 through a channel 153.

In each of the two pump housings 42 a venting groove 98 in common to two pump chambers 29 terminates a venting channel 97 opening out at the top of the pump housings 42 so that the emerging fuel is collected in a leakage fuel collector 96. The venting channel 97 communicates with the pump chambers 29 through inclided channels 94. The venting groove 98 is covered by a screw 95.

The displacer bodies 22 are made from a synthetic resin, preferably syperpolyamide and comprise each a cup-shaped piston 63, a guide collar 64 engaging the pump chamber 29 and an axially extending, elastically deformable piston rod 65, whose end 92 is fastened with the interposition of glue 91 in a wide bore 93 of a guide member 90 of a hard-steel coupling member 20. Owing to the clearance between the piston rod 65 and the bore 93 the piston 63 with the guide collar 64 is displaceable in a radial direction with respect to the guide member 90.

The piston 63 and the whole displacer body 22 are manufactured by a method embodying the invention, in which a spray-casting 54 of a synthetic resin, for example, polyamide is made in a mould 70, the cavity 71 of which is overdimensioned as compared with the final shape of the piston 63 indicated by broken lines 83. First a metal sleeve 74 is placed at the area of the piston rod 65 in the mould 70, when the lid 75 is removed. After the mould 70 is closed, synthetic resin is injected by means of an injection nozzle 76 into the cavity 71, the material thus settling at the end 77 of the piston rod 65 around a collar 81 of the sleeve 74. After the removal from the mould 70 the piston 63 and the guide collar 64 are machined, particularly on the turner's bench, to the prescribed size so that the cup-shaped sealing edge of the piston 63 and of the guide collar 64 will have a satisfactory crystalline structure of high resistance to wear. During the machining operation the displacer body 22 is held with its metal sleeve 74 in a rotating clamp.

The valves 39 and 41 are manufactured in a similar manner by the method embodying the invention, in which a spray-casting 154 of a synthetic resin, for example, polyamide, is made in a mould 156, whose cavity 157 is overdimensioned as compared with the final shape of the valves 39 and 41 indicated by the broken lines 158. After the injection into the cavity 157 and after the removal of the spary-casting 154 from the mould 156 the valves 39 and 41 are turned off to the prescribed size, so that a sealing edge 159 of satisfactory material structure and hence of high resistance to wear is obtained.

The device 1 comprises two coupling members 20 and the displacer bodies 22 of each pair of fuel pumps 32 are coupled with one another by means of a coupling member 20. Each coupling member 20 is connected through an elastic coupling member 66 with an armature 18. The displacement volume of each fuel pump 32 is determined by the stroke of the coupling member 20, which will reciprocate with a curved arm 79 between the wedges 26 and 33.

Two flights of housings 69 comprise each two contiguous pump housings 42, between which wedges 26 and 33 are disposed as common actuating means for each of the pumps 32. A satisfactory seal of the piston 63 is obtained, since the guide member 90 guided in the cylinder 59 absorbs the tilting forces produced when the arm 79 strikes a wedge 26 or 33 outside the axis 85 of the cylinder 59.

The wedge 26 is driven by a piston 80 of a controlcylinder 73 communicating behind an air inlet valve 113 with the air inlet manifold 72 of the combustion engine 31, said cylinder being secured by clamps 119 to the frame plate 3. Outside the control-cylinder 73, at the end remote from the wedge 26, an axially displaceable switch 82 is actuated by a hat-like cup spring 166 of the piston 80. The switch 82 disconnects the pumps 32, when the pressure in the inlet manifold 72 drops below a given value. A reset spring 167 bears via the hat-like cup spring 166 and a ball 168 held therein on the piston 80, whose spherical surface 169 is in contact with the inner wall 115 of the cylinder 73. In this way a short cylinder 73 with low frictional resistance is obtained. The switch 82 preferably has known make-and-break contacts connected, as shown in FIG. 11, by means of a circuitry 160 to the terminals $K_1$ and $K_2$ of each circuit 170 of FIG. 6. The circuitry 160 comprises three resistors 171, a transistor 172 and a relay 173. In order to avoid mechanical overload of the switch 82, it is actuated by the piston 80 through an abutting member 175 arranged beneath the cup spring 166 and resiliently held by a spring 174. The wedge 33 is coupled with barometer bellows 176, coupled in turn with a temperature feeler 178 affected by the engine temperature. For this purpose the lower end of the barometer bellows 176 bears on a rod fastened to the wedge 33. In the case of a low barometric pressure and/or of a high engine temperature sensed by the feeler 178 and taken by the silicon cylinder 177, the wedge 33 is urged down for reducing the quantity of fuel. In order to maintain a low frictional resistance and to obtain compact actuating means, the piston 179 of the silicon cylinder 177 is hollow and has a hat-like bottom 182 for holding a slack compression spring 180, which is strongly biassed and which urges the piston 179 upwardly with respect to the wedge 33, whilst the bottom 181 of the barometer bellows 176 also having the shape of a hat, surrounds with ample clearance the hat-like bottom 182 and the piston 179 fits with ample clearance in the cylinder 177. With this construction the wedge-shaped stop 33 responds to slight pressure variations.

Each electro-magnet 2 is energized by means of a circuitry 170 shown in FIG. 6. An input $K_3$ receives a control-pulse from a pulse generator 34, which is coupled with a cam shaft 163 of the engine 31. The pulse generator 34 comprises a rotary contact 155, which sequentially contacts one of the four contacts 16 for the sequential energization of the electromagnets 2. Each of these four contacts 16 is connected to an input terminal $K_3$ of one of four circuits 170. In this way the fuel required for each cylinder is injected by an atomizer 30 at the required instant of each cycle of the combustion engine 31. The sequence of energization of the electro-magnets 2 is chosen so that each of the wedges 26 and 33 is transiently set free of a coupling member 20 during each cycle so that they can be displaced each by slight forces. The switch 82 is included between the accumulator 35 and the contact 155 so that, when the switch 82 is switched off, no control-pulses are provided.

The device 201 shown in FIGS. 12 to 14 for the delivery of fuel to eight atomizers 230 of an eight-cylinder combustion engine 231 is essentially a duplication of the device 1, two devices 1 being mounted on a common frame plate 203.

Above each quadrant 238 of the common frame plate 203 an armature 218 extends transversely of the frame plate 203 between two alternately energized electro-magnets 202 and is connected with a coupling member 220, which extends near the central longitudinal plane 237 of the frame plate 203 in the direction of length thereof, said coupling member 220 having at each end a piston 222 limiting one of eight pump chambers 229. In the central longitudinal plane 237 a pump housing set 224 having four pump chambers 229 is arranged at the centre and two pump housing set 268 having two pump chambers 229 are arranged at the ends of the frame plate 203. Four wedge-shaped stops 26 are disposed in the central longitudinal plane 237.

As illustrated in FIG. 14, each atomizer 230 injects fuel directly into a compression-loaded combustion chamber 225 so that in all combustion cylinders 217 the injection takes place at the same instant of the combustion cycle. Since the instant of the initial movement of each armature 218 depends upon the distance e between the armature 218 and the energized electro-magnet 202, it is important for all armatures 218 to be at the same distance e at the start of each stroke. For this purpose the four wedge-shaped stops 26 are displaced in an identical way in order for the curved arms 79 of each armature 218 to reciprocate symmetrically to the central longitudinal plane 211 of each gap between two co-operating electro-magnets 202.

FIG. 13 shows the four stops 26, which are coupled through adjustable fastening members 213, flexible members 212 and a rotatably journalled, common control-roller 208 with a regulating member, for example, an accelerator 207, if necessary, through a Bowden cable 219. Compression springs 209 hold the flexible members 212 in the taut state.

When fuel is injected into the compression-loaded combustion chambers 225, for example, at a pressure of 17 ato., the needle valve 397 should close at high pressure by means of a strong tensile spring 395. The needle valve 397 settles vibrating on its hard-steel seat 389, for example, of noble steel, which is accompanied by shock waves in the fuel delivery conduits 228. Therefore, the pressure prevailing in the fuel delivery conduits 228 after the closure of the needle valve 397 is not always of the same value, which results in a varying fuel volume in these fuel delivery conduits 228 and hence in a non-uniform quantity of fuel per injection.

An improved uniformity of the fuel quantity per injection can be obtained by including in each rigid metal fuel delivery conduit 228 a length 251 of a synthetic resin, particularly polyamide, and preferably so near each fuel pump 32. The hoses 251 preferably have equal lengths 1 of the order of 20 cms and an inner and outer diameter of the order of 2 mms and 4 mms respectively. Owing to the length of hose 251 the flow of fuel gradually decreases. This imparts a regulated elasticity to the fuel delivery conduits 228 and results in an improved reproduceability of the fuel displacement.

The device of FIGS. 15 to 25 corresponds with that of FIGS. 1 to 11 with the understanding that the device of FIGS. 15 to 25 is further developed with respect to the following features.

In order to ensure accurate alignment of the cylinder bores of the pairwise coaxially opposite fuel pumps 32, hard steel cylinders 59 are arranged in coaxial, short bores 400 of a U-shaped bridge piece 401. The manufacture and mounting operation are carried out in the stages illustrated in FIGS. 21 to 24. In a metal body 402 is first made and broached a long, uninterrupted bore 403. Then a recess 404 is milled out to obtain a U-shaped bridge piece 401 with two separate, accurately aligned, short bores 400. Subsequently the coupling member 20 is placed in the bridge piece 401. The cylinders 59 fitting with forced fit in the bores 400 are slipped in said bores 400 and around the guide arms 405 of the coupling member 20 previously coated with Araldite. The guide arms 405 engage the cylinders 59 with sliding fit, so that the coupling member 20 is accurately orientated. Each piston 63 has a piston rod 65 and a cavity 406, the passage of which decreases towards the inlet 407. Into this cavity 406 is introduced an excess quantity of liquid Araldite, after which the piston 63 with the piston rod 65 is inserted into a narrowed bore 408 of a guide arm 405, the excessive Araldite passing through a passage 409 into the bore 410 of the coupling member 20 whilst the piston rod 65 is glued to the coupling member 20 by the Araldite. The Araldite in the conical cavity 406 when hardened anchors the piston rod 65 on the guide arm 405. The bore 410 is honed and with the interposition of an elastic coupling 66 the coupling member 20 is secured by means of a pin 424 to an armature 18. Only then the bridge piece 401 is glued to the pump housings 42 by glue 438, for example, Araldite. Said pump housings 42 are bolted to the mounting plate 3. Since owing to the use of the bridge piece 401 the relative positions of the pump housings 42 are not important, the pump housings 42 can simply be secured to the frame plate 3 and may be made at low cost, for example by spray casting of a synthetic resin.

In each pump housing 42 various channels are bored. Behind the bores 411 for valve housings 43 and through the high-level channel 110 are drilled vertical channels 412, receiving non-tapped nipples 413. The bores 412 and 411 communicate with one another through horizontal channels 414. After the insertion of the nipples 413, the inputs of the channels 110 and 414 are closed by plugs 415 of hardening material, for example, Araldite.

These plugs 415 safeguard the fixation of the nipples 413.

A reset spring 167 bears on the piston 80 via the hat-shaped cup spring 166 and a ball 168 held therein and formed by a nut screwed to the end of the rod of the wedge 26. The piston 80 engages the inner wall 115 of the cylinder 73 by two axially spaced sliding rings 416 of Rilsan. The spring 167 bears furthermore via a hat-shaped dish 421 on a ball-shaped end 422 of the housing 423 of the switch 82 held therein. In this way a short cylinder 73 with low frictional resistance is obtained. In order to avoid mechanical overload of the switch 82, the switch bears via a spring 417 on a collar 418 of a cover 419. The switch 82 is axially displaceable by screw thread 420 in the cylinder 73 so that the length and hence the bias tension of the spring 167 can be adjusted. Therefore, the spring 167 need not have an accurately predetermined length and any spring having the required spring constant will suffise.

The wedge 33 is coupled with a barometer bellows 176. Inside the bellows 176 the prevailing pressure is not more than 5 mms Hg. Therefore, the influence of the temperature variation on the adjustment of the wedge 33 is slight. The spring 425 acting against the bellows 176 must have a high bias tension, i.e. 600 mms Hg, whilst the path of the wedge 33 amounting, for example, to 6 mms has to be covered at a pressure varying between 600 and 760 mms Hg. The bellows 176 are soldered to the bottom 426 of a hollow piston 427, which is slidable in the cylinder 429 by axially spaced sliding rings of Rilsan. After evacuation of the bellows 176 to 5 mms Hg, the suction nipple 430 is closed by soldering. It is covered by a cap 431 having screw thread 432, which cooperates with a cup spring 433 for the adjustment of the length of the spring 425. Then a cover 434 is screwed onto the cap 431 and secured against rotation by means of a screw driver inserted into a slot 435, guide pins 436 being passed through the cover 434 into the dish 433 as well as a nipple 437. The cylinder 429 is fastened, for example, by means of Araldite to the cover 100 only after the wedge 33 is in its place. Thus the wedge eccentrically engaging the bottom 426 can exert an axial force on the piston 427 without deflecting. The spring 425 surrounding the bellows 176 has a large diameter and hence it is stable.

The quantity of fuel at a stationary run can be adjusted by turning a cap 431 by means of a screw driver inserted into the slot 435.

The barometer bellows 176 are arranged in a barometer housing formed by the cylinder 429, communicating with the air inlet manifold 72 of the combustion engine 31 through a choke valve 439, which can be manually opened when starting the combustion engine 31 in the cold state.

According to the connecting diagram of FIG. 26, an air chamber 440 communicates through a non-return valve 441 with the air inlet manifold 72 and through a choke valve 439 with a nipple 456, said valve 439 being automatically actuated by a control-member 442 subjected to a thermometer 443 connected with the combustion engine 31. Parallel to the choke valve 439 a valve 445 connects the barometer housing 429 via the air chamber 440 with the air inlet manifold 72. The valve 445 is subjected to a feeler 446 responding to the composition of the exhaust gases of the combustion engine 31 in the exhaust 444, the measured CO- and/or $O_2$ content being compared with a value adjusted in a comparator 447 so that the valve 445 is opened when the measured CO-content is equal to, for example, 3%, whereas it is closed when the measured CO-content is equal to 1%. In this way the air/fuel mixture fed to the combustion cylinders of the combustion engine 31 is prevented from becoming too rich for a complete combustion of the fuel.

According to the invention the 6-cylinder combustion engine 31 shown in FIG. 27 is fed by means of an injection device substantially corresponding to the preceding Figures, but having not more than four pump chambers 29. This is rendered possible by six valves 448(1), 448(2), 448(3), 448(4), 448(5) and 448(6) associated with the atomizers 30 injecting fuel into the branches 428 of the air inlet manifold 72 and being associated with the combustion cylinders 17(1), 17(2), 17(3), 17(4), 17(5) and 17(6) respectively. With a conventional sequence of ignition: 1, 5, 3, 6, 2, 4 the valves 448 are opened in said sequence during the inlet strokes of the respective combustion cylinders 17 since a pulse generator 455 arranged on the cam shaft 163 and co-operating with coils 449(1), 449(5), 449(3), 449(6), 449(2) and 449(4) respectively delivers pulses via a circuit 450 for energizing the valves 448, which are opened when required for the instant when one of the four fuel pumps 32 starts delivering fuel, whilst the period of opening is adjusted at such a value that the valves 448 close not until has a fuel pump 32 pumped the full quantity required and has thus taken place a complete injection of fuel.

A pulse generator 451, which may be driven through a gear wheel transmission 452 having a ratio of 3:2 by the cam shaft 163, and co-operating with coils 453(1), 453(2), 453(3) and 453(4) and a circuit 454, delivers pulses to four circuits 170 of the pumps 32(1), 32(2), 32(3) and 32(4).

The chronological diagram is then as follows:

| Ignition sequence | Valve lift | Pump sequence | Position of cam shaft |
|---|---|---|---|
| 1 | 448(1) | 32(1) | 0° |
| 5 | 448(5) | 32(2) | 60° |
| 3 | 448(3) | 32(3) | 120° |
| 6 | 448(6) | 32(4) | 180° |
| 2 | 448(2) | 32(1) | 240° |
| 4 | 448(4) | 32(2) | 300° |
| 1 | 448(1) | 32(3) | 0° |
| 5 | 448(5) | 32(4) | 60° |
| 3 | 448(3) | 32(1) | 120° |
| 6 | 448(6) | 32(2) | 180° |
| 2 | 448(2) | 32(3) | 240° |
| 4 | 448(4) | 32(4) | 300° |

As a matter of course a 4-cylinder fuel pump can in this way feed any combustion engine, for example, a 3-, 5-, 7- or 8-cylinder combustion engine.

Instead of using a mechanical transmission having a ratio unequal to 1:1 between the cam shaft 163 and the pulse generator 451 for the fuel pumps 32, a pulse generator 451 may be arranged on the cam shaft 163 to cooperate, in the case of a 6-cylinder engine, with six coils 449 distributed about the circumference, in which case an electric circuitry is required for the sequential and alternate energization of the magnets of the fuel pumps 32.

What I claim is:

1. A device for delivering fuel to a combustion engine, in which the pump chambers of at least two fuel pumps are arranged coaxially at a distance from one another, are communicating each through an inlet valve with a fuel supply and through an outlet valve with a fuel delivery port to be connected with the combustion engine and are limited by a displacer body reciprocated by driving means, said two displacer bodies and the driving means being intercoupled by means of a coupling member arranged between the two fuel pumps, characterized in that the pump chambers are provided in coaxial bores in the two ends of a bridge piece, one end being located in the pump housing of one fuel pump and the other end in the pump housing of the other fuel pump, whilst at least one intermediate piece interconnects the two ends of the bridge piece.

2. A device as claimed in claim 1, characterized in that the pump chambers are bounded by hard steel cylinders arranged in the coaxial bores of the bridge piece.

3. A device for delivering fuel to a plurality of atomizers of a combustion engine, in which each of the four pump chambers of four fuel pumps arranged each in a pump housing has a displacement volume adjustable by actuating means, is communicating through an inlet valve with a fuel supply and through an outlet valve with a fuel delivery part connected with at least one atomizer injecting fuel into a combustion cylinder of the combustion engine and is limited by at least one displacer body reciprocated by driving means characterized in that the fuel delivery part of each fuel pump is connected through alternately opened valves with a plurality of atomizers of the combustion engine.

4. A device for delivering fuel to at least one atomizer of a combustion engine, in which the pump chamber of at least one fuel pump accommodated in a pump housing has a displacement volume adjustable by actuating means, is communicating through an inlet valve with a fuel supply and through an outlet valve with a fuel delivery part connected with an atomizer injecting fuel into a combustion cylinder of the combustion engine and is limited by at least one displacer body caused to reciprocate by driving means, characterized in that the fuel delivery part is at least partly elastic.

5. A device as claimed in claim 4, characterized in that the fuel delivery part comprises a length of hose near the fuel pump.

6. A device as claimed in claim 4 characterized in that the fuel delivery part comprises a length of hose of the order of 20 cms.

7. A device as claimed in claim 4 characterized in that the fuel delivery part comprises a metal piece and a length of hose.

8. A device as claimed in claim 7 characterized in that the length of hose is made from a polyamide.

9. A device as claimed in claim 8 characterized in that the length of hose has an inner diameter of the order of 2 mms and an outer diameter of the order of 4 mms.

10. A fuel pump comprising, in combination:
a unitary bridge piece of generally U-shaped configuration presenting a pair of spaced ends and an intermediate member interconnecting said ends, each end having an outer side face and an inner side face in which the inner side faces of the two ends are in mutually opposed, spaced relation, each end having a bore therethrough opening onto its inner and outer side faces and the bores of the two ends being axially aligned;
first and second cylinders frictionally received in the respective bores of said ends;
a coupling member having first and second, oppositely directed guide arms slidably received respectively in said first and second cylinders whereby said coupling member is guided for rectilinear reciprocation back and forth along the coaxial axes of said cylinders;
first and second pistons at the respective ends of said first and second guide arms;
first and second housings disposed in fixed relation to each other, one of said housings mounting one of said ends and the other of said housings mounting the other of said ends and said housings cooperatively holding said bridge piece in fixed position, said housings being spaced apart with said intermediate member of the bridge piece extending across such space; and
drive means connected to said coupling member and operating between said housings for reciprocating said coupling member.

11. In a fuel pump, a bridge piece having a pair of spaced ends and an intermediate member interconnecting said ends, each end having an outer side face and an inner side face in which the inner side faces of the two ends are in mutually opposed, spaced relation, each end having a bore therethrough opening onto its inner and outer side faces and the bores of the two ends being axially aligned, first and second cylinders frictionally received in the respective bores of said ends, a coupling member having first and second, oppositely directed guide arms slidably received respectively in said first and second cylinders whereby said coupling member is guided for rectilinear reciprocation back and forth along the coaxial axes of said cylinders, and first and second pistons at the respective ends of said first and second cylinders.

12. In a fuel pump as defined in claim 11 wherein each guide arm is provided with an axial recess extending inwardly from its end, each piston having a rod secured within a respective axial recess.

13. In a fuel pump as defined in claim 12 wherein each piston rod is of a diameter less than that of the axial recess within which it is received, each piston including a guide collar remote from the free end of its piston rod and slidably received in a respective cylinder, each piston rod being flexible and being secured to said coupling member only at said free end thereof.

14. In a fuel pump as defined in claim 11 including a frame plate and a pair of pump housings secured to said frame plate in spaced relation to each other, said ends of the bridge piece being attached to respective one of said pump housings with said intermediate member bridging the space between such housings.

15. In a fuel pump as defined in claim 14 wherein each pump housing is provided with a valve assembly comprising inlet valve means and outlet valve means, each pump housing having a passage registered with the free end of a respective cylinder, said inlet and outlet valve means communicating with said passage.

16. In a fuel pump as defined in claim 11 including a pair of pump housings disposed in spaced relation to each other, each pump housing having a recess therein receiving a respective one of said ends of the bridge piece, each recess presenting an abutment surface against which the free end of a respective cylinder is engaged, each abutment surface having a passage opening thereon and communicating with the associated free end of the respective cylinder, each housing including inlet valve means for supplying fuel to said passage and outlet valve means for conveying fuel from said passage.

17. In a fuel pump as defined in claim 16 including adhesive means securing each end of said bridge piece within a recess of a respective pump housing.

18. A fuel pump assembly comprising, in combination:
- a first plurality of fuel pumps and drive means for causing said pumps to discharge shots of fuel sequentially in accord with the speed of rotation of an associated combustion engine having a second plurality of combustion cylinders which is of greater number than said first plurality;
- valve means for delivering fuel to said combustion cylinders;
- conduit means connecting said fuel pumps to said valve means, and means for actuating said valve means in timed relation to the speed of rotation of said engine whereby said fuel pumps deliver fuel to all of said combustion cylinders;
- each of said fuel pumps having a pump chamber communicating through an inlet valve with a fuel supply and through an outlet valve with said conduit means and including a displacer body reciprocated by driving means, there being at least two fuel pumps in which the displacer bodies thereof are intercoupled by means of a coupling member, the pump chambers of said two fuel pumps being provided in coaxial bores in the two ends of a bridge piece, which bridge piece includes an intermediate piece interconnecting the two ends of the bridge piece.

* * * * *